United States Patent
Julia et al.

(10) Patent No.: US 7,574,453 B2
(45) Date of Patent: Aug. 11, 2009

(54) SYSTEM AND METHOD FOR ENABLING SEARCH AND RETRIEVAL OPERATIONS TO BE PERFORMED FOR DATA ITEMS AND RECORDS USING DATA OBTAINED FROM ASSOCIATED VOICE FILES

(75) Inventors: Luc Julia, Oakland, CA (US);
Alexandre Guion, Emeryville, CA (US);
Johan Le Nerriec, Berkeley, CA (US);
Rafael Cortina, Berkeley, CA (US);
Stephen Marth, San Ramon, CA (US)

(73) Assignee: Orb Networks, Inc., Oakland, CA (US)

( * ) Notice: Subject to any disclaimer, the term of this patent is extended or adjusted under 35 U.S.C. 154(b) by 239 days.

(21) Appl. No.: 11/325,797

(22) Filed: Jan. 3, 2006

(65) Prior Publication Data
US 2006/0195445 A1 Aug. 31, 2006

Related U.S. Application Data

(60) Provisional application No. 60/641,338, filed on Jan. 3, 2005.

(51) Int. Cl.
*G06F 17/00* (2006.01)
(52) U.S. Cl. ............... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,132,992 A | 7/1992 | Yurt et al. | |
| 5,253,275 A | 10/1993 | Yurt et al. | |
| 5,550,863 A | 8/1996 | Yurt et al. | |
| 5,661,516 A | 8/1997 | Carles | |
| 5,774,170 A | 6/1998 | Hite et al. | |
| 5,831,664 A | 11/1998 | Wharton et al. | |
| 6,002,720 A | 12/1999 | Yurt et al. | |

(Continued)

FOREIGN PATENT DOCUMENTS

WO    WO01/31852    5/2001

(Continued)

OTHER PUBLICATIONS

U.S. Appl. No. 10/006,914, filed Nov. 9, 2001, Julia, Luc.

(Continued)

*Primary Examiner*—Isaac M Woo
(74) *Attorney, Agent, or Firm*—Shemwell Mahamedi LLP (57) ABSTRACT

A method and system are provided for using the contents of voice files as a basis for enabling search and other selection operations for data items that are associated with those voice files. Voice files may be received having associations with other data items, such as images or records. A corresponding text file is generated for each of the one or more voice files using programmatic means, such as a speech-to-text application. Each text file is provided an association with a data item based on the association of the voice file that served as the basis of its creation. Each text file is then made available for the performance of search and selection operations that result in the identification of associated data items.

17 Claims, 5 Drawing Sheets

U.S. PATENT DOCUMENTS

| | | | |
|---|---|---|---|
| 6,144,702 | A | 11/2000 | Yurt et al. |
| 6,157,621 | A | 12/2000 | Brown et al. |
| 6,209,132 | B1 | 3/2001 | Harrison et al. |
| 6,212,282 | B1 | 4/2001 | Mershon |
| 6,263,503 | B1 | 7/2001 | Margulis |
| 6,263,505 | B1 | 7/2001 | Walker et al. |
| 6,310,886 | B1 | 10/2001 | Barton |
| 6,327,608 | B1 | 12/2001 | Dillingham |
| 6,349,410 | B1 | 2/2002 | Lortz |
| 6,437,836 | B1 | 8/2002 | Huang et al. |
| 6,470,378 | B1 | 10/2002 | Tracton et al. |
| 6,496,122 | B2 | 12/2002 | Sampsell |
| 6,535,848 | B1 * | 3/2003 | Ortega et al. ............... 704/235 |
| 6,567,984 | B1 | 5/2003 | Allport |
| 6,668,256 | B1 | 12/2003 | Lynch |
| 6,718,551 | B1 | 4/2004 | Swix et al. |
| 6,754,907 | B1 | 6/2004 | Schumacher et al. |
| 6,757,906 | B1 | 6/2004 | Look et al. |
| 6,826,589 | B2 | 11/2004 | Berrada |
| 6,836,786 | B1 | 12/2004 | Zoller et al. |
| 6,975,836 | B2 | 12/2005 | Tashiro et al. |
| 7,206,303 | B2 | 4/2007 | Karas et al. |
| 7,219,136 | B1 | 5/2007 | Danner et al. |
| 7,260,600 | B1 | 8/2007 | Dunn et al. |
| 7,272,594 | B1 | 9/2007 | Lynch et al. |
| 7,292,979 | B2 | 11/2007 | Karas et al. |
| 2002/0002707 | A1 | 1/2002 | Ekel et al. |
| 2002/0010925 | A1 | 1/2002 | Kikinis |
| 2002/0026507 | A1 | 2/2002 | Sears et al. |
| 2002/0046406 | A1 | 4/2002 | Chelehmal et al. |
| 2002/0056112 | A1 | 5/2002 | Dureau et al. |
| 2002/0100063 | A1 | 7/2002 | Herigstad et al. |
| 2002/0143531 | A1 * | 10/2002 | Kahn ....................... 704/235 |
| 2002/0162120 | A1 | 10/2002 | Mitchell |
| 2003/0093813 | A1 | 5/2003 | Shintani et al. |
| 2003/0192054 | A1 | 10/2003 | Birks et al. |
| 2004/0045039 | A1 | 3/2004 | Harrison et al. |
| 2004/0049624 | A1 | 3/2004 | Salmonsen |
| 2004/0060071 | A1 | 3/2004 | Shteyn |
| 2004/0117845 | A1 | 6/2004 | Karaoguz et al. |
| 2004/0117846 | A1 | 6/2004 | Karaoguz et al. |
| 2004/0117849 | A1 | 6/2004 | Karaoguz et al. |
| 2005/0028208 | A1 | 2/2005 | Ellis et al. |
| 2006/0280157 | A1 | 12/2006 | Karaoguz et al. |

FOREIGN PATENT DOCUMENTS

| | | |
|---|---|---|
| WO | WO01/33839 | 5/2001 |
| WO | WO03/052552 | 6/2003 |

OTHER PUBLICATIONS

U.S. Appl. No. 10/888,606, filed Jul. 9, 2004, Julia et al.
U.S. Appl. No. 10/888,633, filed Jul. 9, 2004, Julia et al.
U.S. Appl. No. 10/888,745, filed Jul. 9, 2004, Julia et al.
U.S. Appl. No. 11/538,800, filed Oct. 4, 2006, Julia et al.
U.S. Appl. No. 60/577,833, filed Jun. 7, 2004, Krikorian.
Final Office Action mailed Feb. 4, 2008 for US 2003/0093791 (U.S. Appl. No. 10/006,914) 18 pgs.
Goldberg, et al., The Ninja Jukebox, conference proceedings from the 2nd USENIX Symposium on Internet Technologies and Systems, Oct. 11-14, 1999, pp. 37-46, Boulder, Colorado.
International Search Report and Written Opinion of the International Searching Authority for PCT/US05/24324 mailed Jul. 20, 2007.
Network, The Authoratative Dictionary of IEEE Standards Terms, 7th Edition 2000.
Non-Final Office Action mailed Feb. 12, 2008 for US 2006/0080452 (U.S. Appl. No. 10/888,745) 15 pages.
Non-final Office Action mailed Jan. 17, 2008 for US 2007/0207755 (U.S. Appl. No. 11/538,800) 11 pgs.
Office Action for U.S. Appl. No. 10/888,633 mailed Jan. 9, 2008, 18 pages.
Path Construction for Multimedia Applications, website material from: bnrg.cs.berkeley.edu/~zmao/cs294-1/multimediaReport.doc, circa Oct. 1999.
TV Brick Home Server, web site as of Jul. 1, 2004, <http://www.tvbrick.com>, provided by <http://archive.org> 4 pages.
TV Brick Home Server, web site as of May 25, 2004, <http://www.tvbrick.com>, provided by <http://archive.org> 4 pages.
TV Brick Home Server, web site as of Jun. 8, 2004, <http://www.tvbrick.com>, provided by <http://archive.org> 4 pages.
TV Brick Home Server, web site as of Jun. 9, 2004, <http://www.tvbrick.com>, provided by <http://archive.org> 4 pages.
TV Brick Home Server, web site as of May 20, 2004, <http://www.tvbrick.com>, provided by <http://archive.org> 4 pages.
TV Brick Home Server, web site as of Feb. 10, 2004, <http://www.tvbrick.com>, provided by <http://archive.org> 4 pages.
TV Brick Home Server, web site as of Jun. 12, <http://www.tvbrick.com>, provided by <http://archive.org> 4 pages.
TV Brick Home Server, web site as of May 8, 2004, <http://www.tvbrick.com>, provided by <http://archive.org> 4 pages.
TV Brick Home Server, web site as of Mar. 22, 2004, <http://www.tvbrick.com>, provided by <http://archive.org > 4 pages.
TV Brick Home Server, web site as of Feb. 3, 2004, <http://www.tvbrick.com>, provided by <http://archive.org> 4 pages.
TV Brick Home Server, web site as of Dec. 28, 2003, <http://www.tvbrick.com>, provided by <http://archive.org> 4 pages.
TV Brick Home Server, web site as of Dec. 2, 2003, <http://www.tvbrick.com>, provided by <http://archive.org> 4 pages.
TV Brick Home Server, web site as of Oct. 9, 2003, <http://www.tvbrick.com>, provided by <http://archive.org> 4 pages.
TV Brick Home Server, web site as of Jul. 19, 2003, <http://www.tvbrick.com>, provided by <http://archive.org> 4 pages.
TV Brick Home Server, web site as of Jul. 4, 2003, <http://www.tvbrick.com>, provided by <http://archive.org> 4 pages.
TV Brick Home Server, web site as of Jun. 29, 2003, <http://www.tvbrick.com>, provided by <http://archive.org> 4 pages.
TV Brick Home Server, web site as of Apr. 7, 2004, <http://www.tvbrick.com>, provided by <http://archive.org> 4 pages.
TV 'brick' opens up copyright can of worms, by Benoit Faucon, The Wall Street Journal (from Australian Financial Review) Jul. 1, 2003, published online Oct. 20, 2003 on http://mex-at-the-blogspot.com/search?q=brick, 1 page.

* cited by examiner

SYSTEM AND METHOD FOR ENABLING SEARCH AND RETRIEVAL OPERATIONS TO BE PERFORMED FOR DATA ITEMS AND RECORDS USING DATA OBTAINED FROM ASSOCIATED VOICE FILES

RELATED APPLICATION

This application claims benefit of priority to U.S. Provisional Application No. 60/641,338, filed Jan. 3, 2005, the aforementioned priority application being hereby incorporated by reference in its entirety.

TECHNICAL FIELD

The disclosed embodiments relate generally to the field of data management. In particular, the disclosed embodiments relate to a system and method for enabling search and selection operations to be performed for data items and records using data obtained from associated voice files.

BACKGROUND

Applications that use voice files are increasingly popular. For example, in the realm of handheld devices and smart phones, voice memo applications provide a useful tool for individuals to maintain reminders and thoughts. Such memos can be associated with records from other applications, such as calendar events and contacts. For small devices, voice input allows users to compensate for the lack of user-input mechanisms, such as keyboards.

Voice tags are relatively small voice files that are used in association with other data items. Currently, some devices allow individuals to generate voice tags for phone numbers, where the voice tags are played back when that phone number is used. For example, a user may create a voice tag for a contact, and when an incoming telephone call is detected from that contact, the voice tag is played back.

Cameras, video recorders, and devices capable of capturing images and videos are often equipped to record voice tags. A user can record voice tags to identify the occasion or context of a when a digital image is taken. Images can then be transferred from device to computer, and amongst computers. With the transfer, the identifying or characteristic voice tag can also be transferred. Thus, the user can take a picture and record a voice tag using a digital camera, transfer the image to a desktop computer, and still be able to have the voice tag associated with the image and available for playback.

DETAILED DESCRIPTION

Embodiments of the invention enable data to be generated from the contents of voice files for purpose of enabling the performance of search and selection operations. According to an embodiment, search and selection operations may be performed to identify data items that are associated with voice files. Examples of such data items include images or records, for which users generate voice tags or files as additional content or associated material. As such, a user can create voice tags and/or memos with images, records and/or other data items, and later be able to use data derived from those voice files to perform search and selection operations for select data items.

Generally, voice files can be used to provide supplemental or characteristic information about data items. For example, digital cameras are sometimes equipped with the ability to enable the user to record voice tags along with recorded images. This voice file can be transferred from the device to a computer and stored in association with the image, so that the voice file is retrievable at a later date and identifiable to the same picture. In some applications, voice files can provide content for a data item. For example, in the context of a video capturing device, an audio file containing speech or voice data may accompany a file containing video data. Voice files can also provide content for personal information management (PIM) applications. For example, users can enter voice memos that verbally described a contact's preference, and this voice file can be attached with the contact record for later use. Numerous other examples exist of how voice files can be used in association with other data items. According to an embodiment described herein, a person can search and retrieve data items using the associated voice files. Additionally, the search and selections may be performed through use of search terms and selection criteria.

Many past approaches have limited the use of voice files to playback. In contrast, an embodiment of the invention enable uses to search and retrieve data items by searching searchable files generated from the contents of voice files associated with those data items. In one embodiment, a user may search such voice files using text-based search terms and criterion. The result is that a person can rely on voice files to perform operations that include searching, sorting and organizing, when in the past, the user's ability to use such voice files beyond playback was very limited.

A method and system are provided for using the contents of voice files as a basis for enabling search and other selection operations to be performed for data items that are associated with those voice files. In one embodiment, voice files are received having associations with other data items, such as images or records. A corresponding text file is generated for each of the one or more voice files using programmatic means, such as a speech-to-text application. Each text file is provided an association with a data item. This association is based on the association of the voice file that served as the basis of text file's creation. Each text file is then made available for the performance of search and selection operations that result in the identification of associated data items.

A voice file corresponds to any audio file that contains spoken words or utterances of a user. A voice tag is a voice file that is short in duration, usually lasting only a few words.

Examples of data items include digital images and records. Specific kinds of records that can be used include calendar events, list items (e.g. to-do list, shopping list, expense list), memos from a memorandum application, contacts, ink notes, and messages (e.g. emails). A user may, in connection with any of the data items listed, generate a voice file.

According to another embodiment, a system is provided that includes an interface module and a presentation module. The interface module may receive data items and voice files associated with designated or individual data items. The interface module feeds voice data from the voice file to a speech-to-text application to cause a resulting text file to be generated. This text file may be stored in association with the data item. The presentation module may be configured to identify a text selection criteria from a user input. A comparison operation may be performed on the text file in order to determine whether the text file satisfies the text selection criteria.

Comparison operations may correspond to search operations, including operations performed to match user-entered search terms with content or text contained in the text files.

Methods described with this application, or portions thereof, may be performed programmatically. As used herein, the term "programmatically" means through the use of programming, code or computer-implemented instructions.

One or more embodiments described herein may be implemented using modules. A module may include a program, a subroutine, a portion of a program, a software component or a hardware component capable of performing a stated task or function. As used herein, a module can exist on a hardware component such as a server independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

Figure 1:
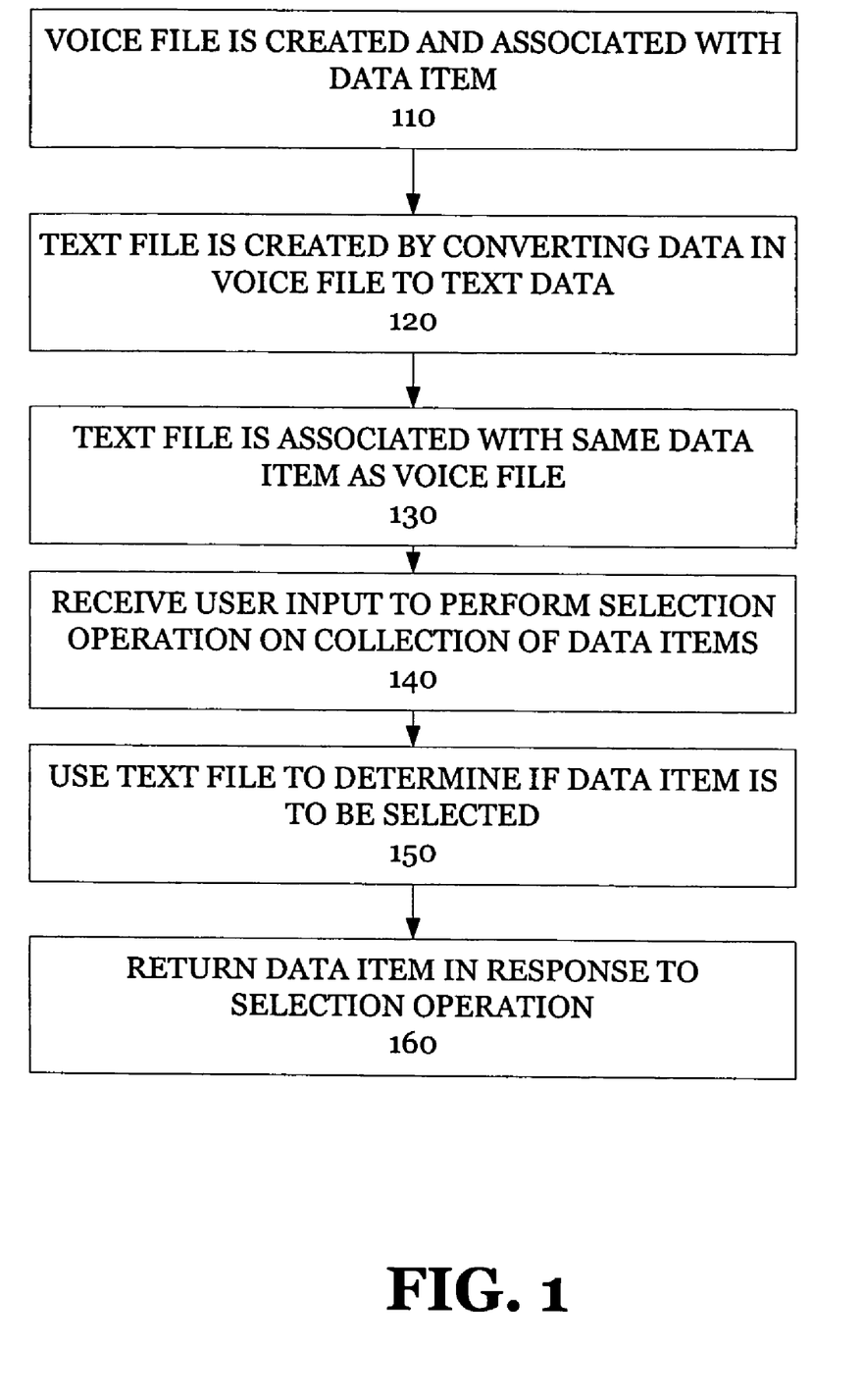
FIG. 1 illustrates a method for using voice files associated with data items to perform search and selection operations for specific data items, under an embodiment of the invention.

FIG. 1 illustrates a method for using voice files associated with data items to perform search and selection operations for specific data items, according to one embodiment of the invention.

Step 110 provides that a voice file is created and associated with a data item. One scenario may correspond to a user generating a voice tag for a recently captured digital image. In such a scenario, a digital camera may be equipped with a microphone to enable the user to enter a voice tag. Alternatively, the digital camera functionality may be integrated into a smart phone device, in which case the smart phone may include the microphone and application to enable the user to create a voice file. Numerous other examples exist for using voice file sin association with other data items. For example, one scenario may correspond to a user inserting a voice memorandum as a calendar event, or as a record in a memorandum list. Still further, the voice file may correspond to audible voice data contained in an audio file that accompanies a video clip.

In step 120, a text file is created from the voice file. This step may be performed programmatically. In one embodiment, data from the voice file is fed into a speech-to-text application. This may be accomplished by directing data from the voice file into the speech-to-text application with no playback, or by playing back the voice file in the presence of the speech-to-text application.

In step 130, the association for the text file is made. This association may be to the same data item that the voice file, from which the text file is created, is associated with. As an example, a digital image having a voice tag may, as a result of completing this step, also have associated with it a text file, and this text file may be created from the voice tag. As such, the contents of the text file may have correspondence to the contents of the voice tag. Also, while the text file and the voice file may have correspondence in content, this correspondence may be imperfect, or even non-existent, as a result of the fact that speech-to-text applications have limited accuracy.

Once text files are established, step 140 provides that user-input is received to perform a selection operation on a collection of data items. The user-input may be in the form of text, such as a word, term or string of alphanumeric characters. Some or all of the data items in the collection may have voice and text files associated with them, in a manner consistent with performance of steps 110-130. A selection operation may, for example, correspond to a search of data items that match a particular criteria, a sort of data items based on one or more criteria, or a structuring or organization of data items based on the one or more criteria.

In step 150, the user-input is compared against the contents of the text file to determine if the data item associated with that text file is subject to be selected. In one embodiment, the term or word entered by the user is compared against all terms and words in the text file to determine if the text file matches the user-input. More sophisticated search and retrieval algorithms may also be used to determine items that match a search term or criteria when the match is not exact.

If the text file does match the user-input, then step 160 returns the data item associated with the text file. A method such as described by FIG. 1 may be repeated for other data items and text files in order to find all data items that have associated text files which match the user's request.

Figure 2:
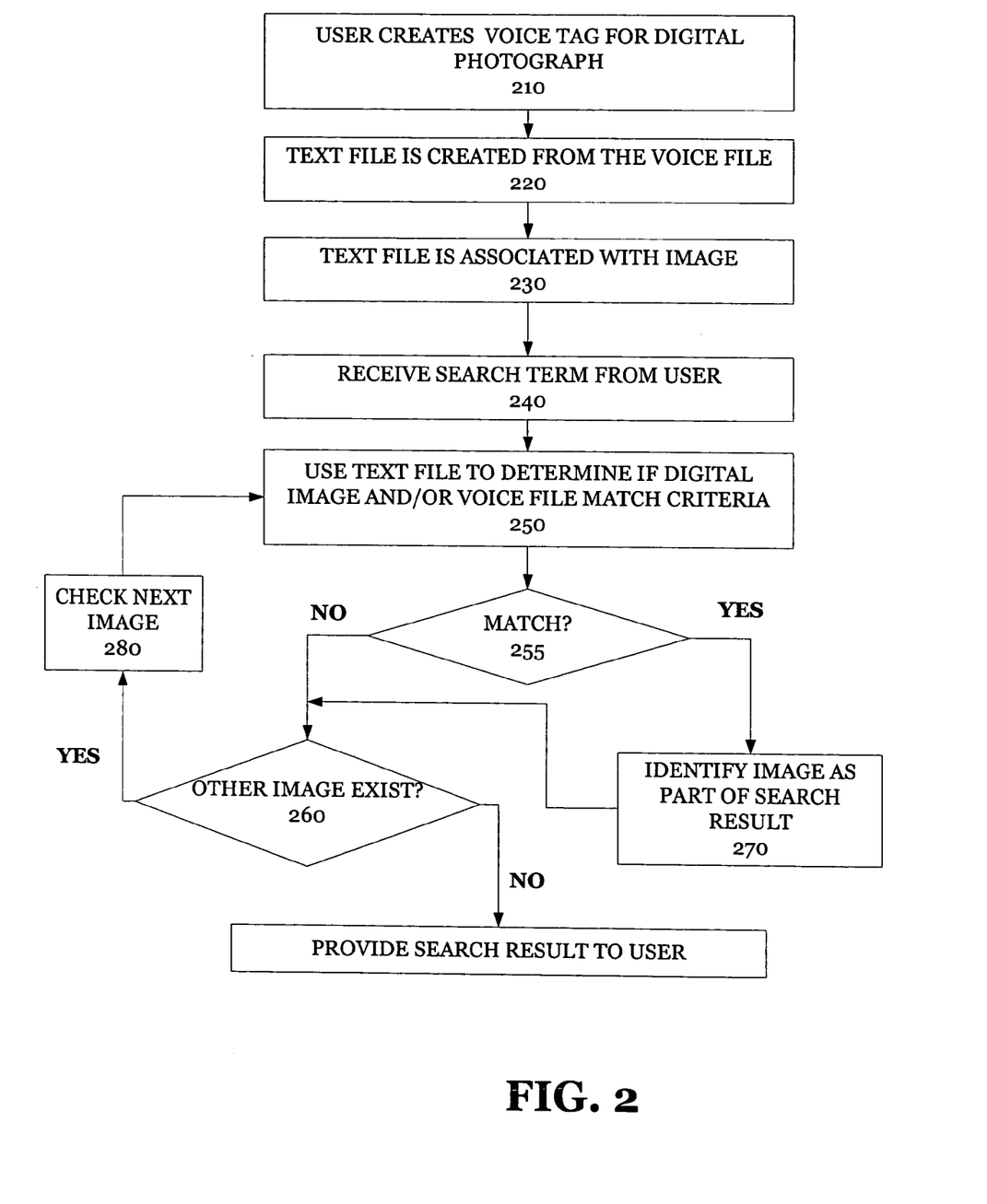
FIG. 2 illustrates a method for allowing users search for digital images using the contents of voice tags created with the images, under an embodiment of the invention.

FIG. 2 illustrates a method for allowing users search for digital images using the contents of voice tags created with the images, under an embodiment of the invention. A method such as described with FIG. 2 may be implemented on a computer system on which digital images and possibly voice tags have been transferred. Initially, step 210 provides that a user creates voice tags for corresponding images. The voice tags may be created on the image capturing device (e.g. digital camera or camera-capable phone), or subsequently, when the images are transferred to a desktop computer. By knowing in advance that the user can perform search operations using the contents of the voice tags, the user can speak keywords and/or phrases that are characteristic of the image being taken, or of the context of the image being taken.

Step 220 provides that a text file is created from the voice tag. In one embodiment, this step may be performed by applying the voice tag with a speech-to-text recognition application.

In step 230, the text file is associated with the same set of images that the voice tag was associated with. In one embodiment, metadata associating a voice tag with a set of one or more images is copied for a metadata file of the text file.

In step 240, a search term is received from a user. The search term may be entered at a time when the pictures are downloaded are provided on a computer system such as a media station or desktop computer. In one embodiment, the search terms can be in the form of a keyword, or multiple keywords that are related to one another through the use of BOOLEAN operators. An interface may be provided to extract criterion from the user's input. In one embodiment, the search request may be entered through the use of speech and then handled by a speech recognition application or script which then converts the speech to text input.

In step 250, the contents of the text files are searched for matches to the identified search terms. For example, text files that contain close matches may be identified. However, given that speech-to-text applications can be inaccurate, exact matches may not be necessary. If the user enters two words, for example, matching results may be identified from text files that contain one of the two words. As another example, if the user enters one word, the phonetic equivalent in a text file may be deemed matching. Numerous search algorithms may be employed, with different variants. Thus, the particular search algorithm used may be one of design choice or implementation.

A search may be processed for each text file in a folder or collection of images. Thus, if in step 255, a determination of whether a particular file is matching is negative, step 260 provides that a determination is made as to whether another unchecked text file exists. If the determination in step 255 is positive, then step 270 provides that the image associated with the text file that matched the search request is identified for the search result. After step 270, the determination of step 260 is performed. If the determination is that another unchecked text file exists, then step 280 provides that the other text file is retrieved. Step 250 is then performed, with the comparison of the contents of the new text file being made against the search term. Otherwise, when the determination of step 260 is that no more text files exist to be searched, then step 290 provides that a search result is provided to the user. In one embodiment, the search result comprises the images for which there are associated text files that matched the search term of the user. In one embodiment, the search result is presented to the user, such as in the form of a slideshow.

To provide an example, a user may search a collection of digital images having voice tags by specifying a search term (e.g. "Birthday" or "Holiday"). The search term may be specified as a text-based entry, through, for example, a keyboard (or even through a speech recognition application that generates text output). When the user enters the search term, the text files are searched for words that match the search term. The images that satisfy the search term are the images for which there are associated text files having words that satisfy the search term. This may include exact matches, or close matches to permit for misspellings or phonetic equivalents. The result of the user's search request may be in the form of a presentation, such as a slide show, where a series of images are shown one after another. With the images, the voice files may also be played back. The text files, however, may be kept hidden from the user. The text files are thus used to match search result, while the voice files may enrich the slide show presentation.

System Overview

Figure 3:
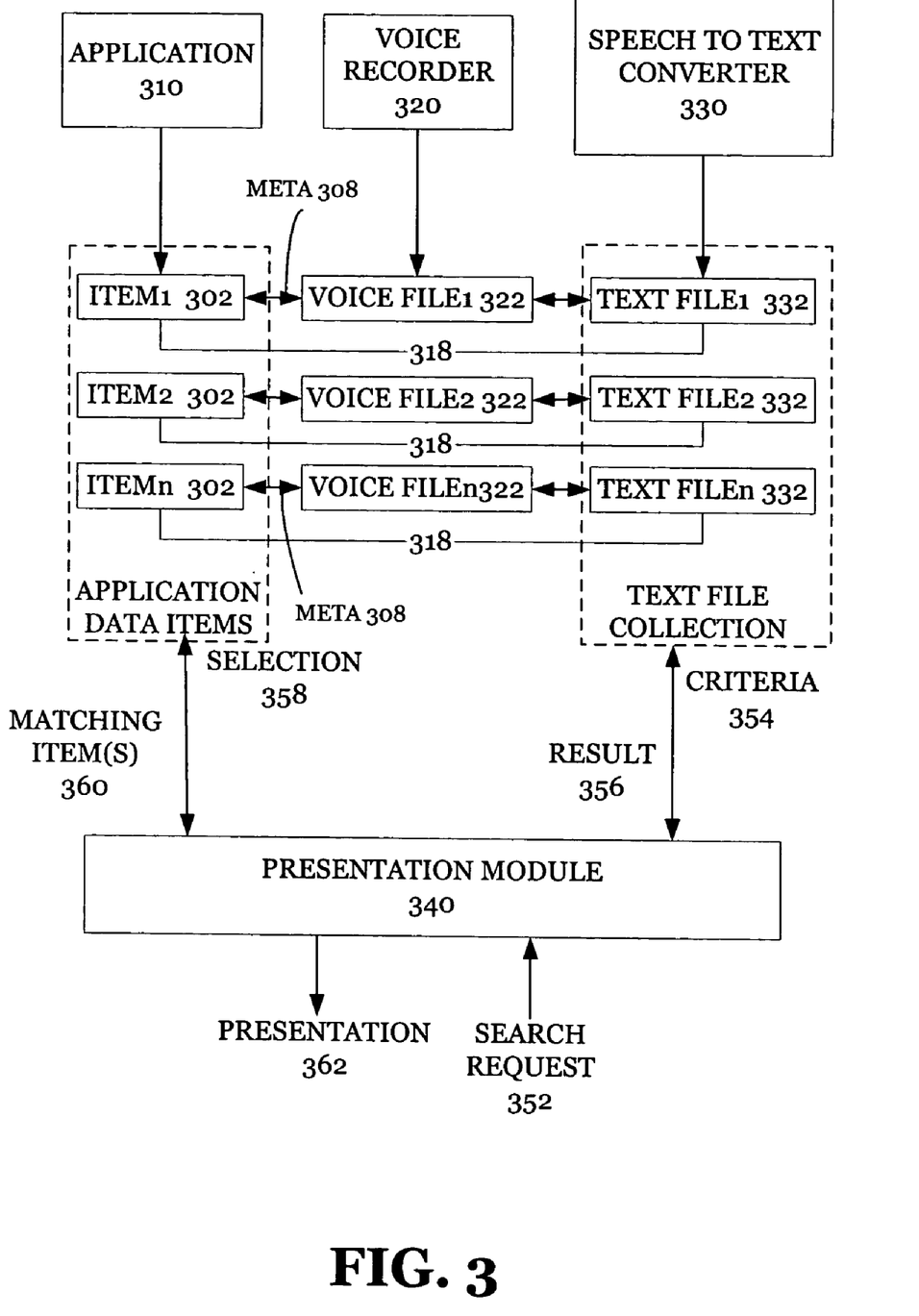
FIG. 3 is a block diagram of a system for implementing methods such as described with FIGS. 1 and 2, under an embodiment of the invention.

FIG. 3 is a block diagram of a system for implementing methods such as described with FIGS. 1 and 2, according to one embodiment. In FIG. 3, a set of data items 302 are associated with individual voice files 322. A user may generate individual voice files 322 to be associated with one or more data items 302. Each data item 302 may be created through the use of an application 310. The data items 302 may correspond to files or records, including for example, digital images, calendar events, list items, memos from a memorandum application, contacts, ink notes, and messages. In one implementation, the data items 302 are homogeneous, meaning they are of one data type or created from the same application. In another embodiment, the data items 302 may be heterogeneous, meaning they are created from different applications and have different data types. Thus, for example, voice files and files created for a collection that includes images, video clips, contact events and other records or documents may all be made part of a system on which embodiments of the invention may be implemented.

In one embodiment, metadata 308 designates the association between voice files 322 and the data items 302. The association may be made at any time, including just after the creation of the data item, or a subsequent time thereafter. For example, a person may review records or images and provide voice files on a separate computer from which the data items were generated. The voice files 322 may be created through the use of a voice recorder 320, which may include a combination of hardware or software. However, it may also be possible for some voice files to be created from other voice files or other sources. For example, one voice file may be computer-generated or a copy from another voice file.

A speech-to-text conversion application 330 may generate a collection of text files 332. Each text file 332 may be generated by applying a corresponding one of the voice files 322 as input to the speech-to-text conversion application 330. As individual text files 332 are generated from corresponding voice files 322, each text file may be associated with a data item of the corresponding voice file. In one embodiment, the association between individual text files 332 and data items 302 is created by copying metadata 308 that associates the corresponding voice file 322 with one of the data items 302. Resulting metadata 318 may form the association between text files 332 and data items 302. As such, metadata provides one example of how associations between files can be identified, created and maintained.

In one implementation, voice data from an individual voice file 322 may be fed to the speech-to-text conversion application 330. Alternatively, an individual voice file 322 may be played back for the speech-to-text conversion application 330. The speech-to-text conversion application 330 may be a standard, commercially available application (e.g. as provided with MICROSOFT OFFICE, manufactured by the MICROSOFT CORPORATION). An interface may be provided to the speech-to-text conversion application 330 to configure its use for an application such as shown in FIG. 3. For example, an interface may enable a voice data feed with no playback, or limit the recognized output of the speech-to-text conversion application to words of a sufficient length to improve accuracy.

A presentation module 340 may be provided to enable individuals to perform selection operations for data items 302 using the collection of text files 332. According to embodiments, the presentation module 340 may include user-interface features for receiving input that specifies what data items the user is interested in. FIG. 3 illustrates one implementation, in which the presentation module 340 receives a search request 352 from a user. The search request 352 may be in the form of one or more search terms entered as text, such as through a keyboard, menu selection field, or even through a speech recognition application. Multiple search terms may be related to one another through use of operators, such as BOOLEAN operators.

In response to receiving the search request 352, the presentation module 340 may identify one or more criterion 354. The criterion 354 and the search term may be the same. Alternatively, the criterion 354 may be derived from the search term. The criterion 354 is used to search the collection of text files 332 for text files that satisfy the criterion. Depending on how the search and selection algorithm is implemented, this may correspond to inspecting text in the content of individual text files 332 for character strings that match the criterion 354. Alternatively, the text files 332 may be inspected for terms, such as keywords, specified in the criterion 354 (or phonetic equivalents, related versions of the word, or words that have some but not all of the search terms).

Inspecting the collection of text files 332 yields a search result 356. In one embodiment, the search result 356 includes identifies of data items 302 that are associated with the text files 332 that satisfy the search request 352. The search result 356 may then be used to retrieve corresponding data items 302. The presentation module 340 may perform a selection operation 358 to retrieve corresponding data items 302 of those identified in the search result 356. The result is that a set of matching data items 360 are retrieved from the collection of data items 302.

In one embodiment, the presentation module 340 generates a presentation 362 based on the matching data items 360. Depending on how embodiments of the invention are implemented, the presentation 360 may be as simple as a list or a panel of thumb-previews. Alternatively, the presentation 362 may render the matching data items in a specific manner, such as through a slide-show. In one embodiment, voice tags 322 generated in association with the data items 302 may be played back when the individual data items are presented. Thus, for example, one implementation provides for a slide show in which matching data items 360 are rendered with playback from corresponding voice files 322.

Component Architecture

Figure 4:
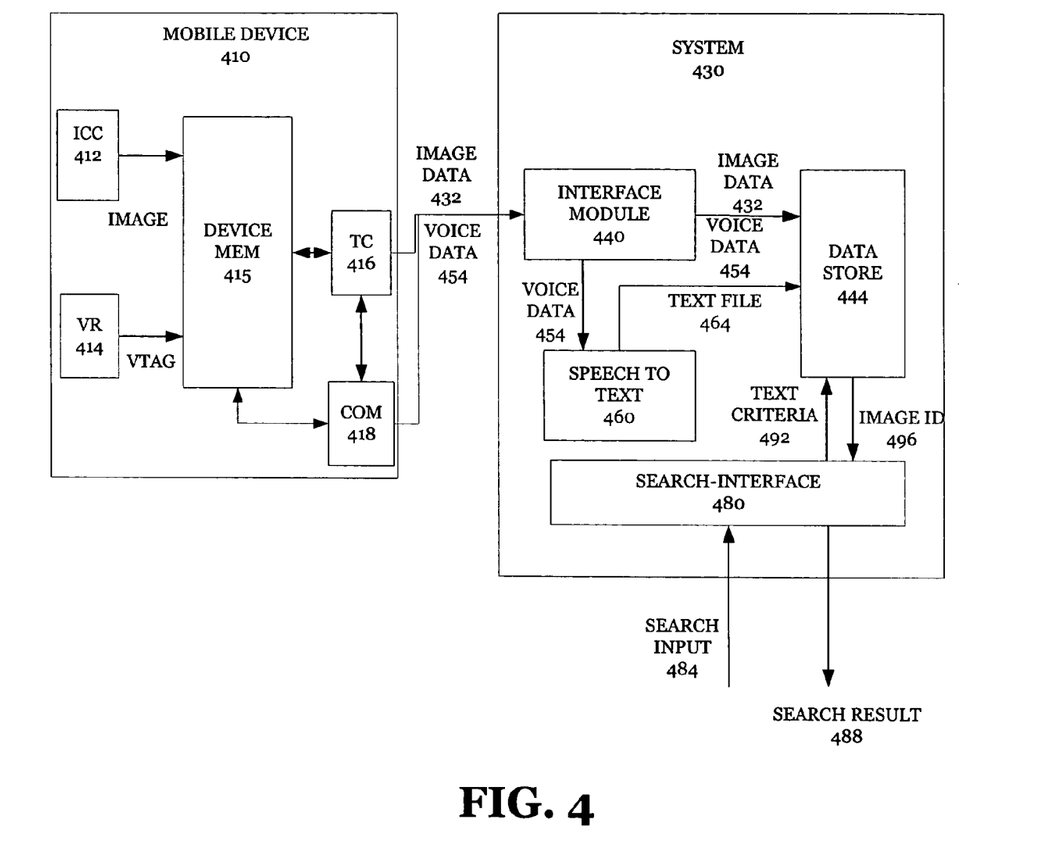
FIG. 4 is a block diagram of a component architecture for a system that uses voice files in association with captured images, according to an embodiment of the invention.

FIG. 4 is a block diagram of a component architecture for a system that uses voice files in association with captured images, according to an embodiment of the invention. In a configuration shown by FIG. 4, a mobile device 410 captures images and transfers data corresponding to the images to a computer system 430. The computer system 430 may include components for generating searchable text files and for providing a search interface.

The mobile device 410 may be equipped with an image capturing component 412 to capture images and to store data corresponding to the images in a device memory 415. The mobile device 410 may also include a voice recorder 414 for receiving voice data. The mobile device 410 may be configured with programming (e.g. software and/or firmware) to enable voice files created through use of voice recorder 414 to be stored in the device memory 415 in association with data files corresponding to digital images. The designation of voice files to digital images may be made by the user through use of user-interface features on the mobile device 410. However, the voice files can be generated at any time, including after the data files corresponding to the digital images have been copied or transferred onto computing system 430.

In one implementation, the mobile device 410 is a cellular wireless device, equipped with image or video capturing functionality. However, the mobile device 410 may correspond to any device having image capturing capabilities, including digital camera or camcorders.

The mobile device 410 is configured for exchanging data with the computer system 430. The medium and mode in which transfer takes place may vary, depending on the implementation and the type of mobile device in use. For example, images and related data stored on the mobile device 410 may be transferred to the computer system 430 through a local connection, such as via wireline, Bluetooth, WIFI, or Infrared mediums. The images and related data may be copied directly or part of a larger synchronization process. Alternatively, in one embodiment, the mobile device 410 includes cellular communication capabilities and a communication application 455 to enable the device to communicate with a designated network or network location. In FIG. 4, a local transfer component 416 is shown for transferring data locally. Alternatively, a communication component 418 may transfer files and data remotely, such as through the Internet and/or across a wireless and cellular network.

In one embodiment, data that is exchanged includes image data for recreating images captured on the mobile device 410, data for voice files associated with the captured images, and data associating voice files with captured images. On the computer system 430, data received from the mobile device may 410 be handled by an interface module 440. The image data form the mobile device 410 may be stored as an item in a data store 444. The voice data and the association data may be used to recreate voice files in association with specific image files in the data store 444.

In addition to storing data transferred from the mobile device 410, the interface module 440 may supply voice data 454 from the voice files to a speech-to-text application 460. The result of supplying data from the voice files to the speech-to-text application 460 is the creation of text files 464. The text files 464 may be stored in the data store 444 in association with corresponding image files. In one embodiment, the interface module 440 may transfer voice data 454 responsively to receiving the data from the mobile device 410. For example, the interface module 440 may supply the voice data 454 to the speech-to-text application 460 on-the-fly, as the image data 432 and the voice data are received from the mobile device 410. The interface module 440 may buffer the incoming data as it stores the data in data store 444 and then concurrently generate text files 464 using the speech-to-text application 460. As an alternative, the interface module 440 may be used-directed or event driven, to retrieve voice data 454 from data store 444 and supply the data to the speech-to-text application 460. In one embodiment, the speech-to-text application 460 and/or the interface module 440 are each configured to enable the speech-to-text application to handle and convert voice data 454 with no playback of audio. To facilitate achieving this result, the interface module 440 may configure voice data 454 into a digitized format used by the speech-to-text application 460.

The interface module 440 may also handle providing the correct associations to each generated text file 464, so that the text files 464 are used in connection with the right images. In one embodiment, the operation of the interface module 440 and speech-to-text application 460 are background, and undetectable to the user. The user may only know of the image files and voice files.

A search-interface 480 may be provided on the computer system 430 to enable user's to enter search input and receive output. The search-interface 480 may coincide with or form part of the presentation module 340 (FIG. 3). The search-interface 480 may be configured to receive search input 484 and provide a search result 488. The search input 484 may be in the form of an alphanumeric entry corresponding to a search term, or sort or selection criteria. In response to receiving the search input 484, the search-interface 480 accesses and searches the contents of text files from the data store 444 using a text criteria 492. Text files that satisfy the search request are identified by the search module 480. The identification of text files are then used to determine image file identifiers 496 and/or image files. This result is incorporated into the search result. The form of the search result 488 may vary depending on implementation. For example, the contents of the search result 488 may list identifiers of images that match the search result, provide previews or thumbnails of those images, provide a view file where the images are rendered, or render those images in a slide show.

Hardware Diagram

Figure 5:
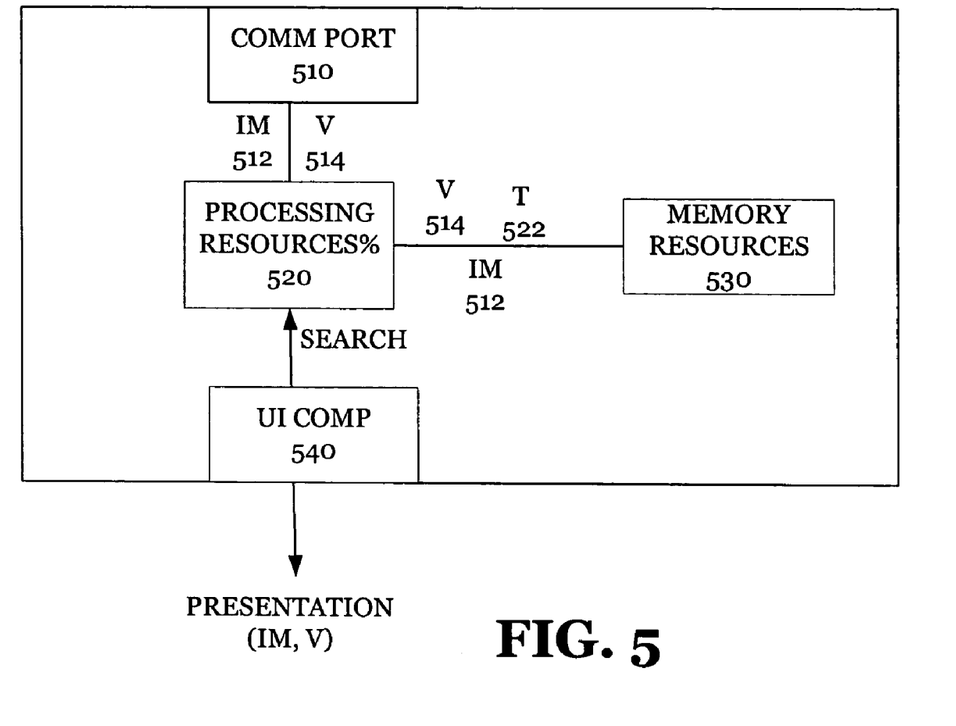
FIG. 5 is a simplified hardware diagram of a system for implementing an embodiment of the invention.

FIG. 5 is a simplified hardware diagram of a system for implementing an embodiment of the invention. A system may include a communication port 510, processing resources 520 and memory 530. Each of these elements may include more than one component, and at more than one location.

In one embodiment, the wireless port 510 communicates with another device or computer (such as mobile device 410) to receive image data 512, and perhaps voice data 514. As mentioned, the communication port can be a local port (e.g. wireline, Bluetooth, WIFI or Infrared), a network port, or even a port for receiving wireless cellular communications. Image data 512 and voice data 514 may be received and handled by processing resources 520. The processing resources 520 may execute instructions to store image data and voice data in appropriate files corresponding to images and voice tags created by the user. Additionally, the processing resources 520 may execute modules and/or applications for converting the voice data 514 into text data 522. For example, processing resources 520 may execute instructions corresponding to speech-to-text application 460 (FIG. 4) and interface module 440.

In addition, processing resources 520 may communicate with user-interface components 540 to process inputs (e.g. search terms and criterion) as well as to provide output. Specific examples of user-interface components for use with embodiments of the invention include a keyboard for enabling the user to enter search terms, a display for displaying images or other records that match the user's request, and a speaker to playback voice files in association with displayed images and records.

In describing FIGS. 4 and 5, specific reference is made to using image data or files as data items for which voice files are associated. While image data and files are specifically mentioned, other kinds of data items can be used with embodiments described therein.

Alternative Embodiments

While embodiments described herein provide for associating a text-based voice tag with an image, one or more embodiments further provide that some or all text data generated for a particular image is incorporated into the actual image, rather than provided as a separate file. In particular, an embodiment contemplates that binary representation of the image is altered to convey text. Such an embodiment requires the file format to enable the text encoding. For example, the JPEG image format enables such encoding.

In one embodiment, the image is altered to convey text as an embedded characteristic. The encoding of the bit map may be altered to include key words (corresponding to detected voice utterances), depending on the limits of the bit layer alterations provided for in the image file format. For example, with JPEG formatted pictures, it is not practical to encode more than 256 characters into the image file. As described with previous embodiments, the text data that is encoded into the image data may be the result of a speech-to-text conversion.

Under one implementation, a user may record a voice tag which is then translated into text. Key words from the text translation may be identified programmatically. Data corresponding to the keywords is then embedded in the image as described. The voice tag may be maintained with the image.

As an example, a user may capture an image, the record a voice tag that states "Birthday 2005-Good time".

Once the text translation is performed, the keyword analysis may identify "Birthday" as a keyword. When the user performs a subsequent search, the results may be identified from text data embedded in the picture, rather than from another text file associated with the image. In the example provided, the search may return the image if the search term is "Birthday".

Furthermore, one or more embodiments of the invention may be used on or implemented with a "personal network", such as described in U.S. patent application Ser. No. 10/888, 606; the aforementioned application being hereby incorporated by reference in its entirety. A personal network is a set of interconnected devices and resources that can communicate and share data across networks, domains, and platforms. Individual components of a personal network are aware of other components and their capabilities, particularly when the other components are relevant to that component. In such an environment, voice files, text files and images may be shared and distributed to different devices that are capable of using such files, particularly in a manner described with one or more embodiments of the invention. Devices that are part of a personal network may also be aware of the presence of the voice files, text files and images if they are capable of using those files. However, numerous other kinds of systems may be used. For example, a system such as described above may correspond to a home network, in which computers, computing devices and media devices are interconnected with one another to share data and to enable Internet connectivity of different devices. Alternatively, no network is needed, as an embodiment may be implemented on just one camera device connected to computer, such as a desktop computer or media station.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for enabling search of visual media data items from a collection, the method being implemented by one or more processors that perform steps comprising:

enabling search operations on select data items that include content other than speech and text, but which have one or more associated files or data that includes speech, by programmatically converting the speech in said associated files or data into text for use with search operations that specify text;

wherein enabling the search operations includes:

identifying the one or more associated files or data, each of the one or more associated files or data pertaining to a respective data item from the collection;

generating a respective text file for each of the one or more associated files or data;

for each of the one or more associated files or data, associating the respective text file with the respective data item; and in response to receiving a textual selection criteria, comparing the selection criteria against text contained in the one or more text files.

2. The method of claim 1, wherein:

identifying the one or more associated files or data includes identifying one or more voice tags generated for a set of one or more data items in the collection that correspond to visual media that corresponds to digital images; and enabling search of the data items in the collection includes using a respective text file pertaining to a voice tag of the one or more voice tags to identify a digital image associated with the voice tag.

3. The method of claim 2, wherein:

identifying one or more voice tags includes identifying one or more voice tags generated for a set of one or more records from a group consisting of: (i) calendar events, (ii) list items, (iii) memos from a memorandum application, (iv) contacts, (v) ink notes, and (vi) messages.

4. The method of claim 1, wherein enabling search of the data items in the collection includes identifying the selection criteria from a user-input.

5. The method of claim 4, wherein identifying the selection criteria from a user-input includes receiving one or more search terms.

6. The method of claim 4, wherein identifying the selection criteria from a user-input includes receiving two or more search terms with a BOOLEAN connector relating the two or more search terms.

7. The method of claim 1, wherein generating a respective text file for each of the one or more associated files or data includes transmitting speech data from each of the one or more associated files or data into a speech-recognition application.

8. The method of claim 1, wherein enabling search of the data items in the collection includes identifying a set of data items, and wherein the method further comprises generating a presentation of the set of data items for a user.

9. The method of claim 8, wherein generating a presentation of the set of data items includes generating a slide show comprising the identified set of data items.

10. The method of claim 1, further comprising storing the collection of visual media data items.

11. The method of claim 10, wherein enabling search of the data items in the collection includes receiving the selection criteria as part of a search request from a user, and presenting one or more video files that satisfy the selection criteria.

12. The method of claim 1, wherein the visual media data items include a plurality of video files, and wherein identifying one or more files includes identifying audible speech contained in audio data that accompanies or is included in the plurality of video files.

13. The method of claim 12, wherein the plurality of video files correspond to a plurality of video clips recorded by the user.

14. A computer implemented method for enabling search of data items from a collection, the method comprising:

enabling search operations on select data items that include content other than speech and text, but which have one or more associated files or data that includes speech, by programmatically converting the speech in said associated files or data into text for use with search operations that specify text;

wherein enabling the search operations includes:

identifying data corresponding to a plurality of data items, each of the plurality of data items having a respective audible speech;

for each data item in the plurality of data items, (i) programmatically extracting the respective audible speech from the received data in response to receiving the data, then (ii) programmatically converting the extracted respective audible speech into a respective text data; and enabling a subsequent search operation for identifying at least a portion of one or more of the plurality of data items by comparing a criteria to respective text data of at least some of the plurality of data items.

15. The method of claim 14, wherein programmatically converting the extracted respective audible speech into a respective text data is performed without playing back any part of the data item, including its audible speech.

16. The method of claim 14, wherein identifying data corresponding to a plurality of data items includes receiving the data over a network.

17. The method of claim 14, wherein enabling a subsequent search operation includes: (i) enabling a user to provide a search term that contains the criteria, and (ii) providing the user with a search result that identifies at least the portion of the one or more data items.

* * * * *